United States Patent Office 2,855,413
Patented Oct. 7, 1958

2,855,413

16-HALOESTRADIOL ESTERS AND ETHERS

George P. Mueller, Park Ridge, Ill., assignor to G. D. Searle & Co., Chicago, Ill., a corporation of Delaware No Drawing. Application November 29, 1957
Serial No. 699,447

5 Claims. (Cl. 260—397.5)

The present invention relates to 16-haloestradiol, esters and ethers thereof. The compounds of the present invention can be represented by the structural formula

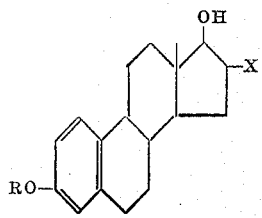

wherein R is a radical selected from the group consisting of hydrogen, (lower)alkanoyl and (lower)alkyl and X is a halogen selected from the group consisting of fluorine, chlorine and bromine. Among the (lower)alkanoyl radicals which R can represent are particularly the acyl radicals of carboxylic acids such as acetyl, propionyl, butyryl, isobutyryl, valeryl, isovaleryl, hexanoyl, heptanoyl and octanoyl. Among the (lower)alkyl radicals which R can represent are methyl, ethyl, propyl, butyl, amyl, hexyl, heptyl, octyl, and branched-chain isomers of the foregoing.

Compounds of the present invention can be prepared by treating 3-carboxylic acid esters or 3-(lower)alkyl ethers of the desired 16-haloestrone with a reducing agent such as lithium aluminum hydride or sodium borohydride and isolating the product. As a specific example, reaction of 16-chloroestrone 3-methyl ether in tetrahydrofuran with lithium aluminum hydride followed by destruction of the excess lithium aluminum hydride with acid and isolation of the product affords 16-chloroestradiol 3-methyl ether.

Reduction of 16-haloestrone 3-acyl esters with reducing agents such as lithium aluminum hydride results in regeneration of the free 3-hydroxyl radical, from which 3-(lower)alkanoyl esters can be prepared by treatment with the desired (lower)alkanoic acid anhydride and pyridine at room temperature followed by isolation and recovery of the product.

Suitable 16-haloestrone 3-(lower)alkyl ethers as initial starting materials can be made by refluxing estrone with the desired alkyl iodide and an acid-binding agent such as potassium carbonate in alcoholic solution, filtering, evaporating the filtrate to dryness, collecting and purifying the product to yield the corresponding estrone 3-(lower)alkyl ethers. The resulting estrone 3-(lower)alkyl ether is converted to estrone enol acetate 3-(lower)alkyl ether by distilling the estrone 3-(lower)alkyl ether with isopropenyl acetate and p-toluenesulfonic acid and isolating the product. The estrone enol acetate 3-(lower)alkyl ether is then treated as desired with a halogenating agent such as N-halosuccinimide or iodine, chlorine or bromine in carbon tetrachloride solution to yield the corresponding 16-haloestrone 3-(lower)alkyl ether. The 16-fluoroestrone 3-(lower)alkyl ethers are prepared conveniently from the corresponding 16-iodoestrone derivative by refluxing the latter with silver fluoride in acetonitrile.

The compounds of the present invention are useful because of their valuable pharmacological properties. For example, they exhibit a lipodiatic effect i. e., they cause a reduction in the serum ratio of cholesterol to phospholipids. They also exhibit estrogenic properties.

This invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples temperatures are given in degrees centigrade (° C.). Quantities of materials are expressed in parts by weight and in parts by volume. Parts by weight bear the same relation to parts by volume as kilograms to liters.

*Example 1*

A solution of 0.43 part by weight of chlorine gas dissolved in 6 parts by volume of carbon tetrachloride is added to a solution of 2 parts by weight of estrone enol acetate 3-methyl ether in 20 parts by volume of carbon tetrachloride containing a suspension of 1 part by weight of finely-ground anhydrous potassium carbonate. While the addition is being made the suspension is cooled in ice with vigorous stirring. After addition is complete the mixture is treated with 1 part by weight of sodium bisulfite dissolved in a minimum quantity of water, diluted with water and extracted with chloroform. The chloroform solution is dried over magnesium sulfate and concentrated in vacuo. The oily residue remaining is dissolved in a small amount of chloroform, the resulting solution treated with 100 parts by volume of methanol, and azeotropically distilled until the chloroform is removed. Crystallization occurs while the solution is being concentrated. The mixture is cooled and the crystalline residue collected and crystallized twice from 10 parts by volume of chloroform to which 100 parts by volume of methanol is added as before. The product thus obtained is 16-chloroestrone 3-methyl ether; melting point 175–179°; $[\alpha]_D = +161°$ (chloroform).

A solution of 15.0 parts by weight of 16 chloroestrone 3-methyl ether in 100 parts by volume of tetrahydrofuran is added over a 10-minute period to a solution of 2.0 parts by weight of lithium aluminum hydride in 100 parts by volume of ether maintained at 0° with vigorous stirring. After an additional two minutes, 40 parts by volume of water is added cautiously, followed by the addition of 40 parts by volume of dilute hydrochloric acid. The mixture is extracted with benzene, the benzene extract washed with aqueous sodium bicarbonate, dried over anhydrous sodium carbonate and concentrated to dryness in vacuo. The residue is dissolved in 100 parts by volume of methanol, cooled and the solid which precipitates is collected and recrystallized from methanol to yield 16-chloroepiestradiol 3-methyl ether; melting point 163–164°; $[\alpha]_D = +68°$ (chloroform).

The mother liquors are combined and chromatographed over 200 parts by weight of magnesium aluminum silicate (sold under the trade name Florex). The column is washed with 1000 parts by volume of petroleum ether (boiling point 65°) and eluted with 2000 parts by volume of 30% benzene in petroleum ether. The solvent is removed from the eluate to yield an additional quantity of 16-chloroepiestradiol 3-methyl ether.

The column is washed with an additional 1000 parts by volume of 30% benzene in petroleum ether and eluted successively with 1000 parts by volume of 40% benzene in petroleum ether, 1000 parts by volume of 50% benzene in petroleum ether and 1000 parts by volume of benzene. The eluates are combined, the solvent removed in vacuo to yield 5.9 parts by weight of 16-chloroestradiol 3-methyl ether; melting point 113–115°; $[\alpha]_D = +72°$.

*Example 2*

A solution of 1 part by weight of 16-chloroestradiol 3-methyl ether in 40 parts by volume of pyridine and 20 parts by volume of acetic anhydride is heated at 100° for 30 minutes. The mixture is cooled and diluted with 400 parts by volume of water. The solid which precipitates is collected, washed with water, dried and recrystallized from aqueous acetone to yield 16-chloroestradiol 3-methyl ether-17-acetate; melting point 141–143°; $[\alpha]_D = +1.9°$ (chloroform).

By substituting an equivalent amount of 16-chloroepiestradiol 3-methyl ether and otherwise following the above procedure, 16-chloroepiestradiol 3-methyl ether-17-acetate is obtained; melting point 168–169°; $[\alpha]_D = +50°$ (chloroform).

*Example 3*

A solution of 1 part by weight of 16-bromoestrone 3-methyl ether in 50 parts by volume of tetrahydrofuran is cooled to 0° and added over a 10-minute period to a solution of 0.8 part by weight of lithium aluminum hydride dissolved in 100 parts by volume of ether at 0° with good stirring. After one hour, 10 parts by volume of methanol is added followed by 50 parts by volume of water and 50 parts by volume of dilute hydrochloric acid. The mixture is extracted with ether, the ether extract washed with sodium bicarbonate solution, dried over anhydrous sodium sulfate and concentrated to dryness. The residue is dissolved in 50 parts by volume of ether, allowed to stand for 30 minutes and the precipitate which forms is collected, washed with ether and dried to yield 0.25 part by weight of 16-bromoepiestradiol 3-methyl ether; melting point 147–149°; $[\alpha]_D = +75°$ (chloroform).

The mother liquors are chromatographed over 15 parts by weight of magnesium aluminum silicate (sold under the trade name Florex). The column is washed with 200 parts by volume of petroleum ether and eluted with 400 parts by volume of 10% benzene in petroleum ether. The solvent is removed from the eluate to yield an additional amount of 16-bromoepiestradiol 3-methyl ether.

The column is further eluted with 400 parts by volume of 30% benzene in petroleum ether followed by 400 parts by volume of 70% benzene in petroleum ether. The eluates are combined and the solvent removed in vacuo to yield 16-bromoestradiol 3-methyl ether which, after recrystallization from ether-petroleum ether, melts at 105–106°; $[\alpha]_D = +53.5°$ (chloroform).

*Example 4*

A solution of 3.54 parts by weight of estrone enol diacetate in 125 parts of volume of carbon tetrachloride containing 25 parts by weight of anhydrous potassium carbonate is treated with 15.2 parts by volume of 0.727 molar chlorine in carbon tetrachloride. The mixture is stirred while maintaining the temperature at about 12° during the addition, which requires about 30 minutes. A solution of 20 parts by weight of sodium thiosulfate in cold water is added and the organic layer is separated and washed with water. It is then dried over anhydrous magnesium sulfate, filtered and the solvent distilled. The residue is dissolved in 40 parts by volume of acetone to which is added 40 parts by volume of pentane and the solution allowed to stand. The crystals which separate are collected and recrystallized once from 60 parts by volume of methanol to yield 16-chloroestrone 3-acetate; melting point 163–166°; $[\alpha]_D = +150°$ (chloroform).

A solution of 17.0 parts by weight of 16-chloroestrone 3-acetate in 100 parts by volume of tetrahydrofuran is added over a 10-minute period to a solution of 4.0 parts by weight of lithium aluminum hydride in 100 parts by volume of ether while maintaining at 0° with vigorous stirring. After an additional 2 minutes, 40 parts by volume of water is added cautiously, followed by the addition of 80 parts by volume of dilute hydrochloric acid. The mixture is extracted with benzene, the benzene extract washed with aqueous sodium bicarbonate, dried over anhydrous sodium sulfate and concentrated to dryness in vacuo. The residue is dissolved in 100 parts by volume of methanol, cooled, and the solid which precipitates is collected and recrystallized from methanol to yield 16-chloroestradiol which has the formula

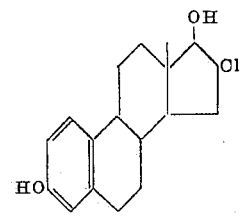

*Example 5*

A solution of 17 parts by weight of 16-chloroestrone 3-n-propyl ether in 100 parts by volume of tetrahydrofuran is added over a 10-minute period to a solution of 2.0 parts by weight of lithium aluminum hydride in 100 parts by volume of ether while maintaining at 0° with vigorous stirring. After an additional 2 minutes, 40 parts by volume of water is added cautiously, followed by the addition of 40 parts by volume of dilute hydrochloric acid. The mixture is extracted with benzene, the benzene extract washed with aqueous sodium bicarbonate, dried over anhydrous sodium sulfate and concentrated to dryness in vacuo. The residue is dissolved in 100 parts by volume of methanol, cooled and the solid which precipitates is collected and recrystallized from methanol to yield 16-chloroestradiol 3-n-propyl ether which has the formula

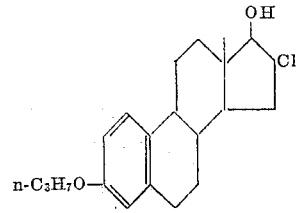

*Example 6*

A solution of 3 parts by weight of 16-bromoestradiol, 30 parts by volume of benzene, 2 parts by volume of pyridine and 1 part of acetic anhydride is allowed to stand at room temperature overnight. The reaction mixture is diluted with 100 parts by volume of water, extracted with 100 parts by volume of benzene, the benzene extract washed with aqueous sodium bicarbonate solution, dried over anhydrous magnesium sulfate and the benzene removed in vacuo. The residue is dissolved in 10 parts by volume of benzene-petroleum ether (1:4) and chromatographed over 100 parts by weight of magnesium aluminum silicate (sold under the trade name Florex). The chromatographic column is eluted with 500 parts by volume of 30% benzene and petroleum ether. The solvent is removed from the eluate in vacuo and the residue crystallized from methanol to yield 16-bromoestradiol 3-acetate.

By substituting an equivalent quantity of isobutyric anhydride for the acetic anhydride and otherwise proceeding as above described, 16-bromoestradiol 3-isobutyrate is obtained.

*Example 7*

A mixture of 3.26 parts by weight of estrone enol acetate 3-methyl ether, 2.5 parts by weight of N-iodosuccinimide and 5 parts by volume of purified dioxane is placed in a reaction vessel, the air displaced with nitrogen, the reaction vessel closed and the contents dissolved by warming and stirring. After all has dissolved, the mixture is heated at 80° for 1.5 hours and then diluted with 20 parts by volume of methanol followed by a concentrated aqueous solution containing 3.3 parts by weight of potassium iodide whereupon the reaction mixture solidifies. An aqueous solution containing 2.48 parts by weight of sodium thiosulfate is added and the mixture cooled in ice with shaking. The reaction product is filtered, washed with water and dissolved in 250 parts by volume of boiling methanol. The methanolic solution is filtered, chilled, the crystalline residue filtered and crystallized once more from 150 parts by volume of methanol to yield irregular plates of 16-iodoesterone 3-methyl ether; melting point 161–166°; $[\alpha]_D = +89.7°$ (0.93% in chloroform).

Five parts by weight of 16-iodoestrone 3-methyl ether is dissolved in 130 parts by volume of acetonitrile and the solution refluxed for 16 hours in a Soxhlet apparatus containing 25 parts by weight of silver fluoride. The mixture is cooled to room temperature, filtered from the suspended silver iodide, diluted with two parts by volume of chloroform, the resulting solution washed thoroughly with water and dried over magnesium sulfate. The magnesium sulfate is filtered off and the filtrate evaporated in vacuo to dryness. The oily residue is dissolved in 20 parts by volume of benzene and 40 parts by volume of petroleum ether and chromatographed over a column of 25 parts by weight of magnesium silicate (known as Florisil). The column is eluted with 700 parts by volume of benzene and the resulting eluate concentrated in vacuo to an oily crystalline residue. The residue in 50% benzene-petroleum ether is chromatographed over a column of 100 parts by weight of silica gel and eluted with 2000 parts by volume of 75% benzene in petroleum ether. The eluate is evaporated to dryness and the residue crystallized successively from benzene-petroleum ether and from ethanol to give 16-fluoroestrone 3-methyl ether in the form of irregular heavy needles; melting point 166–169°; $[\alpha]_D = +157°$ (chloroform).

A solution of 14 parts by weight of 16-fluoroestrone 3-methyl ether in 100 parts by volume of tetrahydrofuran is added over a 10-minute period to a solution of 2.0 parts by weight of lithium aluminum hydride in 100 parts by volume of ether maintained at 0° with vigorous stirring. After an additional two minutes, 40 parts by volume of water is added cautiously, followed by the addition of 40 parts by volume of dilute hydrochloric acid. The mixture is extracted with benzene, the benzene extract washed with aqueous sodium bicarbonate, dried over anhydrous sodium carbonate and concentrated to dryness in vacuo. The residue is dissolved in 100 parts by volume of methanol, cooled and the solid which precipitates is collected and recrystallized from methanol to yield 16-fluoroestradiol 3-methyl ether.

What is claimed is:

1. A compound of the formula

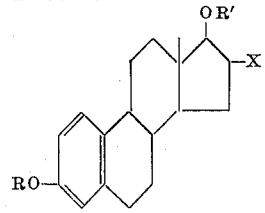

wherein R is a radical selected from the group consisting of hydrogen (lower)alkanoyl and (lower)alkyl, R' is a radical selected from the group consisting of hydrogen and (lower)alkanoyl, and X is a halogen selected from the group consisting of fluorine, chlorine and bromine.

2. 16-chloroestradiol 3-methyl ether.
3. 16-chloroestradiol 3-methyl ether 17-acetate.
4. 16-bromoestradiol 3-methyl ether.
5. 16-chloroestradiol 3-acetate.

No references cited.